Patented June 24, 1947

2,422,668

UNITED STATES PATENT OFFICE 2,422,668

PYRROLE COLORING MATTERS AND METHOD OF MAKING SAME

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,123. In Great Britain July 13, 1942

3 Claims. (Cl. 260—240)

This invention relates to the manufacture of new colouring matters.

According to the invention we provide a process for the manufacture of new colouring matters which comprises causing to interact a 2:4-diarylpyrrole of the formula

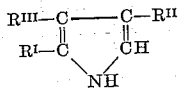

where $R^I$ and $R^{II}$ stand for aryl radicals, for example of the benzene or naphthalene series, substituted or not, the same or different, and where $R^{III}$ stands for hydrogen or for a nonreactive substituent, for example an aryl-, alkyl-, alkylamino-, benzylideneamino- or acylamino-radical, with a nitroso compound other than a nitroso-2:4-diarylpyrrole.

Suitable 2:4-diarylpyrroles include 2:4-diphenylpyrrole, 2 - phenyl-4-(p-methoxyphenyl)-pyrrole, 2 - (p-methoxyphenyl)-4-phenylpyrrole, 2 - (m - hydroxyphenyl)-4-phenylpyrrole, 2 - (o-chlorophenyl) - 4 - phenylpyrrole, 2 - (p - acetylaminophenyl)-4-phenylpyrrole, 2-α-naphthyl-4-phenylpyrrole, 2 - phenyl-4-β - naphthylpyrrole, 2:3:4 - triphenylpyrrole, 3-benzoylamino-2:4-diphenylpyrrole, 3 - acetylamino-2:4-diphenylpyrrole, 3-benzoylamino-2:4-di-p-tolylpyrrole and 3-acetoacetylamino - 2:4 - diphenylpyrrole. The preparation of certain of said 2:4-diphenylpyrroles is described in copending application Serial No. 457,229 filed September 3, 1942, in Serial No. 475,434 filed February 10, 1943, and in corresponding British Patent No. 556,156. Also included are the sulphonic acids of the 2:4-diarylpyrroles, which may be made, for example, by sulphonating the above compounds. The preparation of such sulfonic acids is described in my copending application Serial No. 482,479 filed April 9, 1943. Examples of nitroso compounds include p-nitroso-dimethylaniline, p-nitrosophenol, 1-nitroso-2-naphthol, 1-nitroso-4-naphthol, 1-(3-sulphobenzyl ethylamino) - 4 - nitroso-benzene, 1-(β-hydroxyethyl ethylamino)-4-nitrosobenzene, 3 - nitroso - 2 - phenylindole, 1:3:3-trimethyl-2-nitrosomethylene-dihydroindole, 3-nitroso-N-ethylcarbazole and 1-phenyl-3-methyl-4-nitroso-5-pyrazolone.

The formation of the new colouring matters may be represented, in equation form, as follows, it being noted that the 2:4-diarylpyrrole may, by tautomeric interchange, have either the formula A or B:

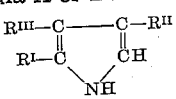 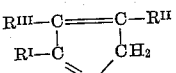

A       B

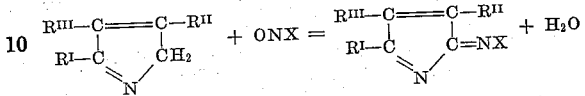

where $R^I$, $R^{II}$ and $R^{III}$ have the significance given above, and where ONX is a nitroso compound other than a nitroso-2:4-diarylpyrrole.

A class of the resulting compounds may be represented by the formula:

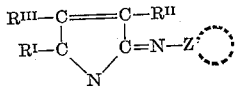

where

is a cyclic ring structure linked through a carbon atom of its ring to the pyrrole nucleus through the =N— radical. Z, for example, constitutes the grouping of elements necessary to complete a cyclic ring structure of a nitroso compound which remains after splitting off the oxygen atom.

In carrying the process of the invention into effect the reactants are usually heated together, advantageously dissolved in a mutual solvent, and preferably in the presence of an acidic condensing agent, for example, acetic anhydride, acetic acid, or hydrochloric acid.

The products may be isolated and purified by conventional methods.

The new colouring matters are from violet to green in colour, and may be used as pigments or for other colouring purposes. In the form of water-soluble derivatives, for example, salts, or sulphonic acids or salts of these, the new colouring matters may be used for dyeing.

Water-soluble derivatives may be obtained by forming salts of those of the colouring matters which are sufficiently basic, for example sulphamic acid, by forming quaternary ammonium salts (when quaternary salt-forming groups are present), or by sulphonation of the colouring matters to yield sulphonic acid derivatives which are in themselves, or in the form of their salts, soluble in water. Alternatively, water-soluble derivatives may be obtained by using as one or both of the ingredients a compound containing already one or more water-solubilising groups, for example, sulphonic acid groups.

The invention is illustrated but not limited by the following example, in which the parts are expressed by weight:

*Example 1*

8.76 parts of 2:4-diphenylpyrrole and 6.0 parts of p-nitrosodimethylaniline are dissolved in 250 parts of methanol by boiling, 3.7 parts of acetic anhydride are then added when the product separates almost immediately in the form of long needles with a greenish coppery lustre. The product is collected by filtration, washed with methanol, and dried. A yield of 10.6 parts is obtained. The new product dyes acetate artificial silk in violet shades from an aqueous suspension.

We claim:

1. An asymmetrical compound containing a single 2:4-diaryl-pyrrole radical and having the general formula:

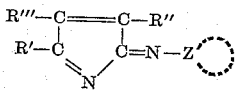

where R' and R'' stand for aryl radicals, R''' stands for a member of the group consisting of hydrogen, aryl-, alkyl-, alkylamino-, benzylideneamino-, and acylamino-radicals where

Z is a cyclic ring structure linked through a carbon atom of its ring to the pyrrole nucleus through the =N— radical.

2. A process which comprises causing to interact two compounds one only of which contains a 2:4-diaryl-pyrrole nucleus and has the general formula:

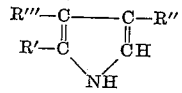

where R' and R'' stand for aryl radicals, R''' stands for a member of the group consisting of hydrogen, aryl-, alkyl-, alkylamino-, benzylideneamino-, and acylamino-radicals and the other is a nitroso compound and recovering an asymmetrical compound of the formula:

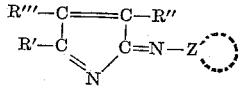

wherein the R's have the aforesaid significance and

Z is a cyclic ring structure linked through a carbon atom of its ring to the pyrrole nucleus through the =N— radical.

3. The process which comprises reacting 2:4-diphenylpyrrole with p-nitrosodimethylaniline in a methyl alcohol solution in the presence of acetic anhydride.

ERIC PAUL GOODINGS.
MAURICE ARTHUR THOROLD ROGERS.

REFERENCES CITED

The following references are of record in the file of this patent:

UNITED STATES PATENTS

| Number | Name | Date |
| --- | --- | --- |
| 2,266,404 | Bienert | Dec. 16, 1941 |

OTHER REFERENCES

Chemical Society Journal, 1937, p. 929.